Jan. 11, 1966

A. M. SWANSON ETAL 3,228,115

APPARATUS FOR AGGREGATING DIFFICULT TO AGGREGATE MATERIALS

Filed Dec. 26, 1962

INVENTOR.
ARTHUR M. SWANSON
DOUGLAS J. FENSKE

BY *Joseph G. Werner*

ATTORNEY

Jan. 11, 1966    A. M. SWANSON ETAL    3,228,115
APPARATUS FOR AGGREGATING DIFFICULT TO AGGREGATE MATERIALS
Filed Dec. 26, 1962    2 Sheets-Sheet 2
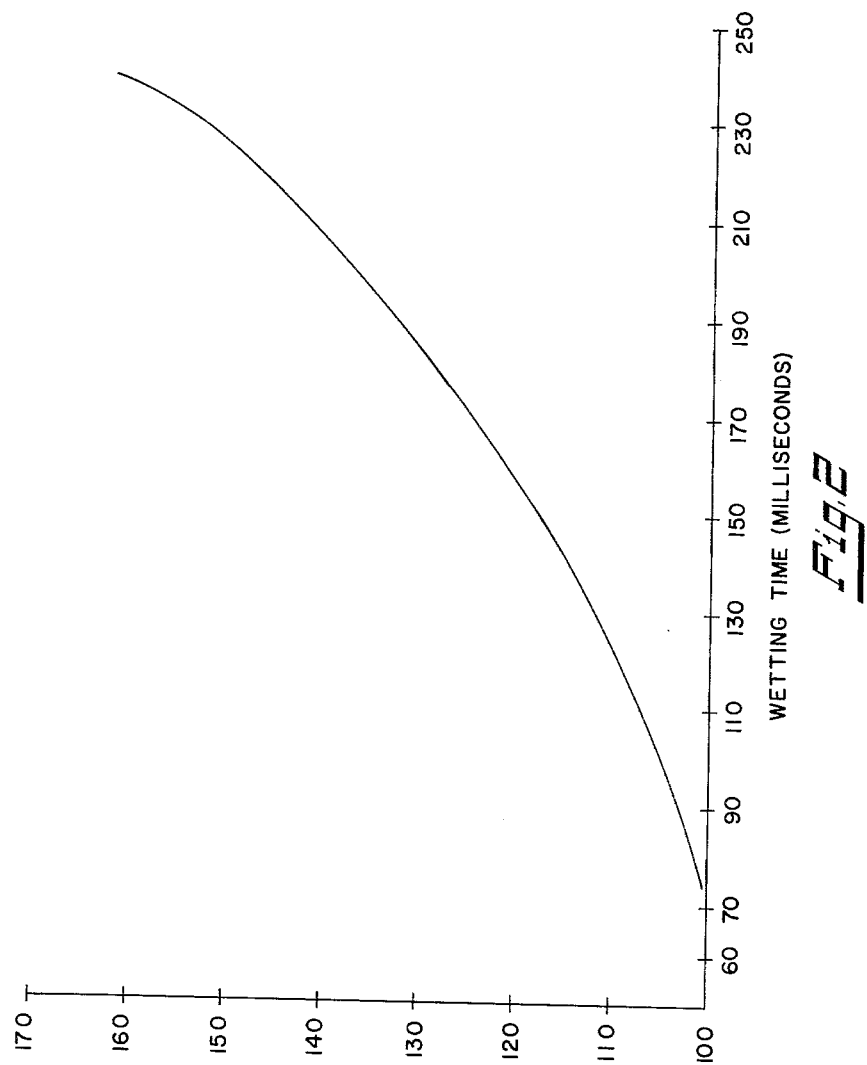
INVENTOR.
ARTHUR M. SWANSON
DOUGLAS J. FENSKE
BY
*Joseph G. Werner*
ATTORNEY United States Patent Office 3,228,115
Patented Jan. 11, 1966

3,228,115
APPARATUS FOR AGGREGATING DIFFICULT TO AGGREGATE MATERIALS
Arthur M. Swanson and Douglas J. Fenske, Madison, Wis., assignors to Dairy-Mour, Inc., a corporation of Wisconsin
Filed Dec. 26, 1962, Ser. No. 247,225
8 Claims. (Cl. 34—57)

The present invention relates to improvements in apparatus for aggregating dried particulate materials, and more particularly, apparatus for aggregating previously difficult to aggregate dried particulate materials.

Most dried materials commercially available today are in the form of relatively small, particulate particles. This is true of spray dried, roller dried, tray dried, or belt dried in atmosphere or vacuum, and crystallized materials. The spray dried materials are in the form of small particulate particles when they are removed from the drier, whereas the products resulting from roller, tray or belt drying and crystallizing processes are puverized after being removed from the driers and the crystallizer in order to give a fairly uniform particle size and appearance to the product. The resulting particle size of all of the above mentioned products is approximately the same, and is so exceedingly small that the particles will tend to "ball up" or form incompletely wetted lumps when they are added to a suitable liquid. Use of such products therefore requires a great deal of time and effort to effect satisfactory reconstitution in water or other liquid. Such poor wetting and reconstituting characteristics have handicapped the popular acceptance of these finely divided dried materials.

It is well known that when certain finely dried particles are "aggregated," the wettability and dispersibility of such materials in liquids is greatly increased. An example of such an aggregated product is the product commonly known as "instant" nonfat dry milk.

"Aggregation" is a process whereby small particulate particles are caused to adhere to each other in random fashion, resulting in porous, open structured aggregates of greater size than the original individual particles. A porous, open structure and increased size are the characteristics which are responsible for the increased flowability, wettability, and dispersibility of the aggregated product in liquids.

There are at the present time several types of commercially available apparatus for aggregating small particulate particles to produce products having improved flowability, wettability and dispersibility. However, such devices have been designed particularly for the purpose of aggregating finely divided dry skim milk, or other easily aggregated materials. Such easily aggregated materials will readily sorb moisture when wetted, will stick together upon colliding after wetting, and will remain stuck or bonded together after being dried by warm air. Dried particles which do not possess all three of these characteristics have been difficult, if not impossible, to aggregate with prior known apparatus.

In order to aggregate certain difficult to aggregate materials, the present inventors have developed a novel method which can be utilized in present conventional aggregators. See co-pending application SN 290,902, filed June 25, 1963, entitled, Process For Aggegating Difficult To Aggregate Particles and the Product Thereof. However, the aggregate size obtainable by our method is sometimes limited by the design of such conventional aggregators. Therefore, we have developed the present apparatus to eliminate the limitations of the prior art devices.

It is a primary object of the present invention to provide apparatus for forming optimum sized aggregates of difficult to aggregate materials having improved flowability, wettability and dispersibility.

It is a further object of the present invention to provide apparatus for aggregating difficult to aggregate materials which permits variation of the wetting time to provide the degree of the aggregation desired.

It is still further object of the present invention to provide apparatus for aggregating difficult to aggregate materials which gently dries the wetted aggregates formed therein with a minimum of attritition and aggregate break up.

It is an additional object of the present invention to provide an apparatus for aggregating difficult to aggregate materials which is extremely efficient, and which has a high capacity for a relatively small size.

It is a still further object of the present invention to provide an apparatus for aggregating difficult to aggregate materials which may be quickly and easily modified to aggregate a variety of such materials.

Other objects and advantages of the present invention will become obvious from the following detailed description taken in conjunction with the accompanying drawings wherein preferred embodiments of the present invention have been selected for exemplification.

FIG. 2 is a graph illustrating the relationship between particle wetting time and average aggregate size for a particular material aggregated with our improved apparatus.

Figure 1:
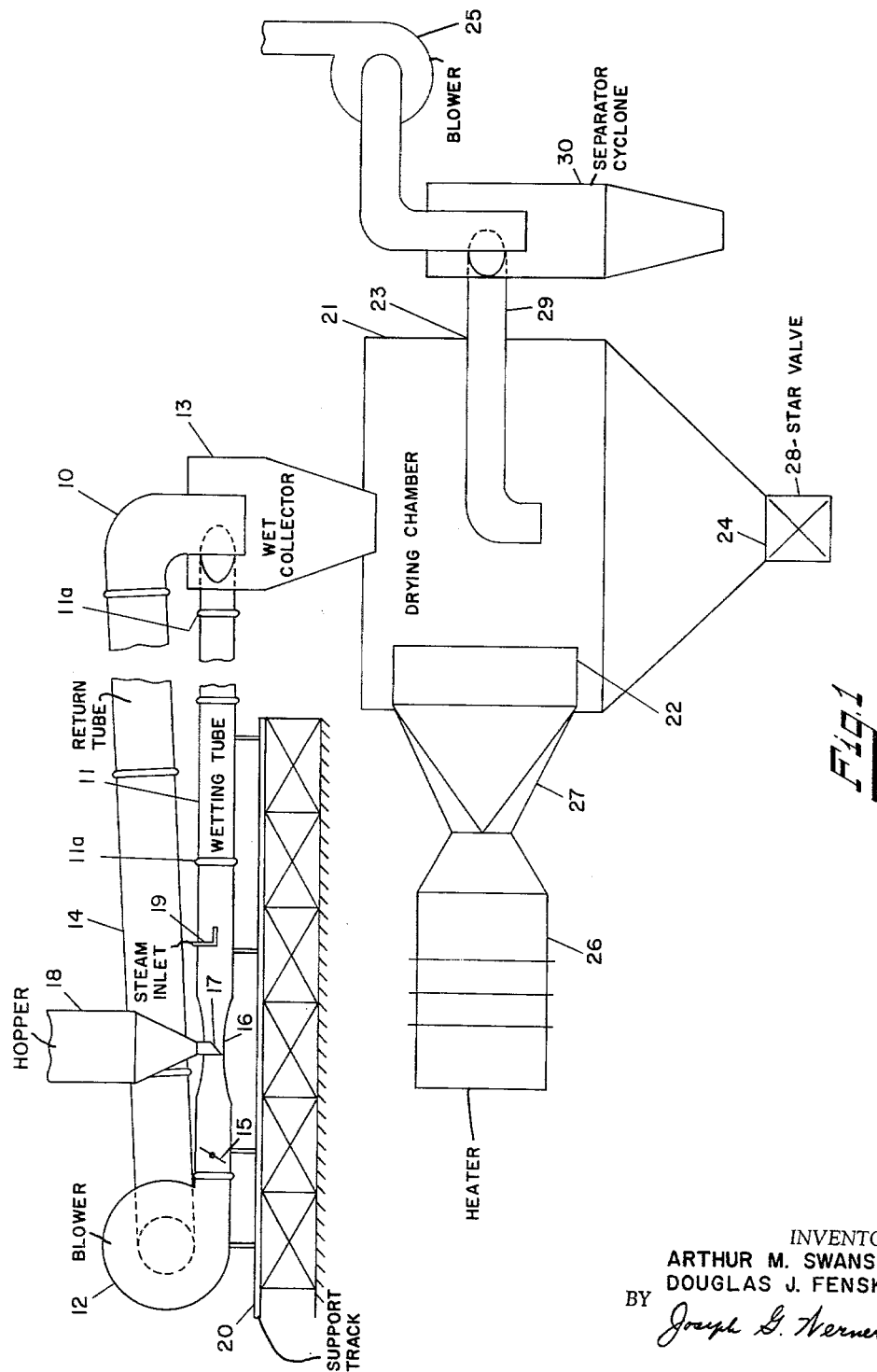
FIG. 1 shows a schematic side elevational view, partially in section, of a preferred form of the present invention.

Generally, our invention is characterized by an elongated wetting tube which is adapted to provide optimum extended wetting times, depending upon the hydroscopicity of the material being processed. Thus, for a material with a relatively low rate of water sorption, one would want to provide for a fairly long wetting time. Our invention is further characterized by its gentle redrying action, in which the wetted aggregates are dried with a minimum of aggregate attrition, thereby minimizing aggregate break-up.

Referring more particularly to the drawings, in which like numerals refer to like parts, FIG. 1 shows a preferred form of our apparatus 10 having a wetting tube 11 of variable length, connected at one end to a blower 12 and communicating at the other end with a wet collector 13, which is preferably a cyclone collector. The length of the wetting tube 11 is preferably varied by uncoupling appropriate tube couplings 11a, and inserting or removing sections of tubing as desired. In practice, a typical wetting tube having a diameter of five inches may be operated at lengths varying from a few feet to 30 or 40 feet or more, depending upon the material being aggregated and the average aggregate size desired. A return tube 14 extends from the approximate center of the wet cyclone 13 to the inlet of the blower 12. The return tube 14 should also be of variable length to permit varying the length of the return tube as the length of the wetting tube 11 is changed. An air control damper 15 is preferably located in the wetting tube 11 adjacent to the blower 12 to control the flow of air therethrough. The flow of air through the wetting tube 11 may also be controlled by means of a variable speed blower if desired. The inside diameter of the wetting tube 11 is reduced at a point near the connection of the wetting tube 11 to the blower 12 to form a venturi 16. The venturi 16 causes an increase in the velocity of air flow at that point, thus causing a drop in air pressure to a subatmospheric level. A powder supply tube 17 extends within the wetting tube 11, opening at the venturi 16. Powder may be supplied to the powder supply tube 17 at a desired rate by means of a hopper 18, as shown, or other suitable means. The powder is then pulled into the wetting tube 11 by the partial vacuum existing at the venturi.

Immediately downstream from the powder inlet and venturi are preferably located one or more steam inlet pipes 19 in communication with the inside of the wetting tube 11. Such steam inlet pipes 19 may be of any desirable configuration, one possible form of which may be a one-half inch diameter pipe extending toward the center of the wetting tube 11 and being bent near the center to exhaust the steam downstream. In a typical apparatus, the steam may be introduced into the wetting tube approximately 20 inches downsteam from the powder inlet. Additional such steam inlet pipes may be employed either at the location of the pipe 19 shown in the drawings, or at various points within the wetting tube 11 downstream from the pipe 19 to produce optimum wetting of the particles to be aggregated. While steam has been found to be the preferable wetting medium, other means for introducing moisture into the wetting tube 11 may be employed, if effective to produce the necessary wetting of the particles to be aggregated.

The blower 12, and the adjacent section of the connected wetting tube 11 containing the air control damper 15, the powder supply tube 17 and the steam inlet 19 are preferably movable with respect to the wet cyclone collector 13 to permit lengthening or shortening the wetting tube 11. This may be accomplished by mounting the blower 12 and adjacent portions of the wetting tube 11 on a support track 20 as shown. The blower 12 and connected elements may be mounted on rollers (not shown) on the support track 20, or may merely be adapted to be supported by and bolted to the track at different positions as desired. The support track 20 should, of course, be of sufficient length to permit use of a wetting tube 11 of whatever length is necessary to adequately wet the materials desired to be aggregated. The return tube 14 is preferably lengthened or shortened at the blower inlet, but portions of the tube 14 may be moved with the blower 12 is desired. In some installations, it may be preferable to maintain the blower 12 and the adjacent connected sections of the wetting tube 11 stationary and move the cyclone collector 13 and communicating elements to permit changing the length of the wetting tube 11 and return tube 14. In such a case, the cyclone collector 13 and communicating elements are preferably track mounted to facilitate their movement.

The wetting tube 11 preferably communicates with the wet cyclone 13 in substantially tangential relation. It has been found that the more nearly the wetting tube approaches a perfectly tangential relationship with the inner surface of the wet cyclone 13, the more efficiently the cyclone will operate. For example, when the connection is nearly tangential, there will be practically no build up of wetted material on the walls of the cyclone collector 13. However, when the connection is not tangential, a build up of aggregated materials tends to form on the side of the collector opposite the entrance of the wetting tube 11. This build up becomes more pronounced as the connection becomes less tangential. The return tube 14 extends downward into the wet cyclone 13 as shown, and returns the moist air from the wetting tube to the inlet of the blower 12 after the wetted aggregates have been separated therefrom.

The lower end of the wet cyclone 13 communicates axially with the drying unit wherein the wetted aggregates emitting from the lower end of the cyclone 13 are quickly and gently dried to produce the desired final product. FIG. 1 shows a preferred drying unit having as its principal element a drying chamber 21 of greater diameter than the wet cyclone 13. For, example, in a typical installation, the upper portion of the wet cyclone 13 may have a diameter of approximately 14 inches, whereas the upper portion of the drying chamber 21 may have a diameter of approximately 56 inches. Of course, the sizes of the wet cyclone 13 and drying chamber 21 will vary widely depending upon the capacity of the particular unit. The drying chamber has a hot air inlet 22, an exhaust outlet 23 and a product outlet 24. Means for supplying hot dry air to the chamber hot air inlet 22 preferably includes an air heater 26, and a hot air supply duct 27 which is attached to the drying chamber 21 in substantially tangential relation. The air is drawn through the heater 26 and supply duct 27 to circulate slowly about the inside of the drying chamber 21 in a cyclonic motion. The air heater 26 may contain both steam coils and direct gas burners to permit heating the air to temperatures as high as 500° F. The hot air inlet 22 and supply duct 27 may be so formed and so located as to produce a generally circular motion of the drying air in the drying chamber 21 in either the same direction or the opposite direction to the rotation of the aggregates in the wet cyclone 13. An exhaust pipe 29 extends from a point near the center of the drying chamber 21, as shown in FIG. 1, outward through exhaust outlet 23 to a separator cyclone 30. The exhaust air is drawn out of the drying chamber 21 and into the separator cyclone 30 by a conventional exhaust fan 25. Any product particles contained in the exhaust air removed from the drying chamber 21 are substantially separated therefrom by the separator cyclone 30. Such particles may be returned to the powder supply hopper 18 for retreatment in the aggregator. In addition to drawing the exhaust air out of the drying chamber 21, the exhaust fan 25 also preferably causes atmospheric air to be drawn into the air heater 26 and through the hot air supply duct 27 to the drying chamber 21. The exhaust fan 25 is of such capacity as to produce a relatively low hot air flow rate through the drying chamber 21 to effect a gentle drying action of the aggregates. A star valve 28, or some other means for controlling the removal of dried aggregate product from the drying chamber 21 is preferably located in communication with the product outlet 24, as shown. If desired, a separate blower (not shown) may be employed to force air through the air heater 26 and air supply duct 27 to the drying chamber 21. However, to achieve maximum effective aggregation of difficult to aggregate particles, the air flow rate through the drying chamber should remain quite low regardless of the means employed for directing drying air therethrough.

A typical operation of our novel aggregator apparatus is as follows:

Where the hydroscopicity of the material to be aggregated is known, the length of the wetting tube is adjusted to produce the wetting time necessary for the formation of the desired sized aggregates. The relationship between the wetting time of the particles and the average aggregate size is illustrated by the graph of FIG. 2, which shows the relationship with respect to a product containing 80% dried egg albumen and 20% anhydrous lactose. This graph will be further described at a later point in the description.

The blower 12 and the exhaust fan 25 are then turned on, and the air entering the drying chamber 21 is heated to an inlet temperature of approximately 480° F. by hot air heater 26. The temperature in the wetting tube 11 will be raised to approximately 140° F. during this warm up period. The flow of air through the wetting tube 11 is adjusted by means of air control damper 15, or by varying the speed of the blower 12 to obtain a velocity only slightly greater than that necessary to retain the wetted aggregates in suspension for the entire length of the tube 11. Thus the wetting time will depend upon both the length of the wetting tube 11 and the velocity of the air flow therethrough. Different materials may require different air velocities to retain the aggregates in suspension.

The material which is to be aggregated is then slowly fed into the powder supply tube 17, and the steam is admitted to the wetting tube 11 through steam inlet pipe 19 at a predetermined rate depending upon the type of material being processed. The steam thus wets the powder particles (which preferably include particles of aggregating agent as described in our co-pending application) whereupon the particles become sticky and adhere together upon collision within the turbulent air flow. The powder feed rate is then increased to a desired level, and product collection is started at star valve 28. As previously explained, the average aggregate size of the collected product is directly proportional to the length of the wetting time of the powder. The longer the wetting time of the powder, the greater the opportunity for the individual particles to sorb enough water to become sticky, and the greater the oportunity for such sticky particles to collide and adhere together before they are dried. Once such particles have adhered together to form aggregates of the desired size, the gentle drying action of our apparatus causes very little aggregate attrition and break-up during drying.

The wetting time of the powder may vary from about 0.01 second up to 1 second, depending upon the material being aggregated and the desired size of the aggregates. Such wetting times are easily achieved with our novel apparatus merely by varying the length of the wetting tube and the amount of the air flow therethrough. The minimum air velocity necessary to keep a given finely divided material in suspension for the entire length of the tube 11 is also dependent upon the type of the material and the size of the aggregates formed. The diameter of the wetting tube 11 of our aggregator is typically about 5 inches for the velocities given. However, the diameter of the tube 11 may be varied considerably depending upon the size of the unit and the types of materials which it is desired to aggregate.

As previously mentioned, the low flow rate of the drying air within the drying chamber 21 minimizes aggregate attrition and break-up during drying. While the total volume of the air passing through the drying chamber 21 will vary considerably for different size drying chambers, it has been found that the rate of revolution of the drying air in cyclonic motion within the drying chamber 21 should be substantially constant, regardless of the size of the unit, to produce comparable drying action. The preferred rate of revolution of the drying air will, of course, vary depending upon the material to be dried, but a rate of between four and thirty revolutions per minute has been found preferable for drying most difficult to aggregate materials. In a typical apparatus of our invention the total volumetric capacity of the drying chamber 21 is approximately 80 cubic feet. In operation, this unit typically has a low air flow rate of approximately 300 standard cubic feet per minute for a capacity of 700 pounds of product per hour. This low air flow rate is in part made possible by the high temperatures of the drying air. Prior devices designed primarily for use in aggregating non-fat milk products, such as Hartman, et al., U.S. Patent No. 2,934,434, have employed drying temperatures of 300 degress or less. Such low temperatures require much greater air flow rates, with correspondingly greater aggregate attrition, to dry the aggregates to the moisture level required. While such high air flow rates are not objectionable when aggregating non-fat milk products (since additional means are usually necessary to break up the large aggregates formed during the aggregation of such products) aggregates of less hydroscopic materials are much more fragile. The production capacity of the present invention will, of course, vary directly with changes in the size of the unit employed.

The process described in our co-pending application may be practiced with the apparatus described herein to produce a final product having an average aggregate size of 150 microns or greater. The larger aggregate size obtainable with our apparatus results in a product having better flowability, wettability, and dispersibility that the product previously obtainable with prior devices.

A further advantage of the present apparatus when operated in accordance with the methods described in our copending application is that it permits successful aggregation of difficult to aggregate materials with a reduced proportion of such aggregating agent. It also may permit aggregation of some of the less difficult to aggregate materials without the addition of the various aggregating agents described therein.

One of the principal advantages of the present novel apparatus is its flexibility. It can be used to aggregate many different difficult to aggregate materials merely by changing the length of wetting time, depending upon the relative ease of aggregating the particular material to be aggregated, to produce the average aggregate size desired. The desired wetting time for any particular product may be determined experimentally, or may be determined theoretically, based on the known aggregation characteristics of the product. For example, the curve shown on the graph of FIG. 3 has been experimentally determined by subjecting a mixture of 80% spray dried egg albumen and 20% anhydrous lactose to various wetting times in our apparatus and determining the average aggregate size of the product formed thereby. If it is desired to aggregate such a mixture with such an apparatus, it is only necessary to look at the graph and find the approximate wetting time necessary to produce the desired average aggregate size. Thus, a relatively difficult to aggregate material will require a relatively long wetting time, wherein a less difficult to aggregate material will require a shorter wetting time.

In practice, the correct wetting time can be quickly determined for any given material to be aggregated. The proper wetting tube length will then be that length necessary to produce the correct wetting time for the air velocity required to retain the particular material to be aggregated in suspension within the wetting tube.

Because of the long wetting times obtainable with our aggregator, and because of the high drying temperatures which permit drying a relatively large amount of powder with a relatively small amount of air, our aggregator apparatus is extremely efficient. Thus, it is seen that a relatively small unit in terms of physical size, will produce a relatively large amount of aggregated product per hour. Such an apparatus has the advantage of reducing the initial cost of the aggregator to the user, and of reducing the plant space requirements of the apparatus. Thus the actual cost of the aggregated products produced thereby is reduced.

It is understood that the present invention is not limited to the particular embodiments herein illustrated and described, but embraces all such variations thereof as come within the scope of the following claims.

We claim:

1. An apparatus for aggregating difficult to aggregate finely divided particles which comprises:
    (a) an elongated wetting tube,
    (b) a blower connected to one end of said wetting tube and being adapted to force a flow of air therethrough,
    (c) means attached to said wetting tube for introducing a substantially continuous flow of finely divided particles into said tube,
    (d) means for introducing a substantially continuous flow of moisture into said tube whereby to wet said particles and cause them to adhere together in random fashion to form aggregates,
    (e) collector means attached to the other end of said wetting tube for separating said aggregates from said air flow,
    (f) a drying chamber in communication with said collector whereby the wetted aggregates separated from said air flow by said collector are delivered by gravity to said drying chamber,
    (g) said drying chamber having a substantially cylindrical inner surface, a hot air inlet, an exhaust outlet, and a product outlet separate from said inlet and exhaust outlet, and (h) means for supplying hot dry air to said hot air inlet at a desired rate whereby to cause said hot air to circulate gently through said chamber and dry said aggregates to the moisture level desired in the final aggregated product, (i) said hot air supply means having a supply outlet substantially tangent to the inner surface of said chamber and in communication with said chamber hot air inlet to direct hot dry air through said hot air inlet and into said chamber.

2. The invention described in claim 1 wherein the wetting tube is of variable length and the distance between the blower and the collector may be readily varied to provide a particle wetting time of the duration desired.

3. The invention described in claim 1 wherein flow control means are provided for regulating the rate of air flow through the wetting tube.

4. The invention described in claim 1 wherein the inside diameter of the wetting tube is reduced for a limited distance at the point of attachment of the means for introducing finely divided particles into the wetting tube, to form a venturi adapted to draw such finely divided particles from said means into the wetting tube.

5. The invention described in claim 1 wherein said collector means comprises a cyclone collector, and wherein an elongated return tube of selectively variable length extends from the approximate center of said cyclone collector to the inlet of said blower means.

6. An apparatus for aggregating difficult to aggregate finely divided material which comprises:

(a) an elongated wetting tube of selectively variable length having an inlet end and an outlet end, (b) means attached to said wetting tube near said inlet end for introducing a substantially continuous flow of finely divided particles into said tube, (c) means for introducing a substantially continuous flow of steam into said tube, (d) blower means in communication with said wetting tube inlet end, (e) said blower means being adapted to force a flow of air through said wetting tube whereby to cause said finely divided particles introduced therein to be wetted by said steam such that said wetted particles adhere together in random fashion to form aggregates, (f) means for selectively limiting the velocity of the air through said wetting tube to the minimum amount which is sufficient to maintain said aggregates in suspended relation, (g) a cyclone collector in communication with said wetting tube outlet end and adapted to separate said moist aggregates from said air flow, (h) a drying chamber in communication with said collector whereby said separated aggregates are delivered by gravity to said drying chamber, (i) means for supplying hot dry air to said hot air inlet at a desired rate whereby to cause said hot air to circulate gently through said chamber and dry said aggregates to the moisture level desired in the final aggregated product, (j) said hot air supply means having a supply outlet substantially tangent to the inner surface of said chamber and in communication with said chamber hot air inlet to direct hot dry air through said hot air inlet and into said chamber, (k) means for controlling the removal of dried aggregate product from said drying chamber.

7. An apparatus for aggregating difficult to aggregate finely divided particles which comprises:

(a) an elongated wetting tube, (b) a blower connected to one end of said wetting tube and being adapted to force a flow of air therethrough, (c) means attached to said wetting tube for introducing a substantially continuous flow of finely divided particles into said tube, (d) means for introducing a substantially continuous flow of moisture into said tube whereby to wet said particles and cause them to adhere together in random fashion to form aggregates, (e) collector means attached to the other end of said wetting tube whereby to separate said aggregates from said air flow, (f) a drying chamber having a substantially cylindrical upper portion, a hot air inlet, an exhaust outlet, and a product outlet separate from said inlet and exhaust outlet, (g) said drying chamber communicating with said collector means such that the wetted aggregates collected in said collector means drop approximately axially downward into said cylindrical upper portion of said dryer chamber, (h) means for supplying and directing air through said hot air inlet and into said cylindrical upper portion in substantially tangential relation to the cylindrical walls thereof, (i) means for heating the air to be directed into said drying chamber by said hot air supply means, (j) said exhaust outlet extending outwardly from the approximate central area of said drying chamber, (k) a separator cyclone having a tangential inlet in communication with said dryer chamber exhaust outlet and having a central air exhaust, (l) blower means for moving hot dry air from said hot air inlet progressively through said drying chamber, said drying chamber exhaust outlet, said separator cyclone, and said separator cyclone central air exhaust at a rate such that said aggregates will be gently dried in said drying chamber to the moisture level desired in the final aggregated product as they are delivered by gravity to said drying chamber product outlet.

8. The invention described in claim 7 wherein the blower means is in communication with the separator cyclone central air exhaust.

References Cited by the Examiner
UNITED STATES PATENTS

| 2,266,292 | 12/1941 | Arnold | 34—10 X |
| 2,406,395 | 8/1946 | Noel | 34—10 |
| 2,544,615 | 3/1951 | Sartorius | 34—164 |
| 2,912,768 | 11/1959 | Huston | 34—57 |

WILLIAM F. O'DEA, *Primary Examiner.*

NORMAN YUDKOFF, *Examiner.*

J. P. ROBINSON, J. J. CAMBY, *Assistant Examiners.*